US012760570B2

(12) United States Patent
Goldman

(10) Patent No.: US 12,760,570 B2
(45) Date of Patent: Oct. 13, 2026

(54) CLOSURE SYSTEM

(71) Applicant: Ilan Goldman, Herzliya (IL)

(72) Inventor: Ilan Goldman, Herzliya (IL)

( * ) Notice: Subject to any disclaimer, the term of this patent is extended or adjusted under 35 U.S.C. 154(b) by 0 days.

(21) Appl. No.: 19/103,818

(22) PCT Filed: Aug. 8, 2023

(86) PCT No.: PCT/IL2023/050819
§ 371 (c)(1),
(2) Date: Feb. 13, 2025

(87) PCT Pub. No.: WO2024/038428
PCT Pub. Date: Feb. 22, 2024

(65) Prior Publication Data

US 2026/0049513 A1 Feb. 19, 2026

(30) Foreign Application Priority Data

Aug. 15, 2022 (IL) .......................................... 295638

(51) Int. Cl.

| | |
|---|---|
| ***E05D 11/10*** | (2006.01) |
| ***E05C 19/00*** | (2006.01) |
| ***E05D 3/02*** | (2006.01) |
| ***E05D 11/00*** | (2006.01) |
| ***E05D 15/58*** | (2006.01) |
| ***E06B 3/50*** | (2006.01) |

(52) U.S. Cl.
CPC ........ *E05D 11/0018* (2013.01); *E05C 19/006* (2013.01); *E05D 3/022* (2013.01); *E05D 11/1007* (2013.01); *E05D 11/1014* (2013.01); *E05D 15/58* (2013.01); *E06B 3/509* (2013.01); *E05D 2015/585* (2013.01); *E05Y 2201/22* (2013.01); *E05Y 2201/474* (2013.01)

(58) Field of Classification Search
CPC ....... E05D 15/581; E05D 15/58; E05D 3/022; E05D 11/0018; E05D 11/1007; E05D 11/1014; E05C 19/006; E06B 3/509
See application file for complete search history.

(56) References Cited

U.S. PATENT DOCUMENTS

| | | | | |
|---|---|---|---|---|
| 3,768,203 A * | 10/1973 | Bellucci | .................... | E05D 3/06 49/340 |
| 3,788,689 A | 1/1974 | Lloyd | | |
| 4,262,447 A * | 4/1981 | Schneier | ............... | E05C 19/006 422/118 |

(Continued)

FOREIGN PATENT DOCUMENTS

| | | |
|---|---|---|
| CN | 210768474 U | 6/2020 |
| DE | 3415094 A1 | 10/1985 |

(Continued)

OTHER PUBLICATIONS

The International Search Report and Written Opinion dated Nov. 27, 2023 in the International Application No. PCT/IL2023/050819.

*Primary Examiner* — Justin B Rephann
(74) *Attorney, Agent, or Firm* — Tarolli, Sundheim, Covell & Tummino LLP

(57) ABSTRACT

The present disclosure concerns a closure system comprising a closure hinged to a fame by a hinge device that permits transition of the closure between open and closed positions by a combined linear movement and rotational displacement.

17 Claims, 15 Drawing Sheets

(56) References Cited

U.S. PATENT DOCUMENTS

| | | | | | |
|---|---|---|---|---|---|
| 4,294,040 | A * | 10/1981 | Crotti | E06B 5/11 49/260 |
| 4,679,353 | A * | 7/1987 | Langenbach | E05D 3/08 49/257 |
| 4,932,160 | A * | 6/1990 | Sperko | E05D 15/28 49/277 |
| 4,993,187 | A * | 2/1991 | Schweiss | E06B 9/02 49/257 |
| 5,056,262 | A * | 10/1991 | Schweiss | E05C 19/006 49/257 |
| 5,953,860 | A * | 9/1999 | Morgan | E06B 9/02 49/257 |
| 7,404,363 | B2 * | 7/2008 | Dunstan | E06B 3/40 109/70 |
| 8,707,625 | B2 | 4/2014 | Raz et al. | |
| 9,506,281 | B1 * | 11/2016 | Zaloom | E05D 11/1028 |
| 2009/0083942 | A1 * | 4/2009 | Sellati | E05F 7/04 16/294 |

FOREIGN PATENT DOCUMENTS

| | | | |
|---|---|---|---|
| DE | 202004001796 | U1 | 4/2004 |
| EP | 1549817 | A1 | 7/2005 |
| KR | 101892246 | B1 | 8/2018 |
| WO | 2016105057 | A1 | 6/2016 |
| WO | 2024038428 | A1 | 2/2024 |

* cited by examiner

CLOSURE SYSTEM

RELATED APPLICATIONS

This application is a U.S. National Stage Application filed under 35 USC 371, claiming priority to Serial No. PCT/IL2023/050819 filed on 8 Aug. 2023, which claims priority to Israeli Application No. 295638 filed 15 Aug. 2022, the entireties of which are incorporated herein by reference.

TECHNOLOGICAL FIELD

The present disclosure concerns a closure system, as well as elements configured for use therewith.

GENERAL DESCRIPTION

The present disclosure concerns a closure system with a novel closure configuration. The closure system comprises a closure unit (which may be a door, a window, a cabinet door, a gate, etc.), a closure frame constituted by frame elements, and a hinging device coupling between one of the frame's elements and the closure unit that enables the new closure functionality. The hinging device is, by itself, of a novel configuration and is one of the enablers of the novel closure system of this disclosure. These features are manifested, among others, in the manner in which the closure unit in the system changes between different positions, including a closed position in which the closure unit is engaged with the two opposite frame elements, typically with the two opposite vertical frame elements, and an open position, the switch being through an initial linear sliding displacement in a direction parallel to the closure system's general plane, and subsequently through rotation in a manner akin to that of a pivoted closure.

The frame elements may be integral parts of a surrounding structure, in which case the frame is constituted by the portions of the structure that surrounds the closure units, or may be parts of a dedicated frame such as that of a door.

By some embodiments, the closure is coupled to a vertical frame element through the hinging device, whereupon the initial sliding displacement is horizontal, and the rotation is about a vertical pivot axis. By other embodiments, the closure is coupled to a horizontal frame element through the hinging device, whereupon the initial sliding displacement is vertical, and the rotation is about a horizontal pivot axis.

In its closed position, the closure unit is engaged with two opposite frame elements, which may be the two opposite vertical frame elements (namely first and second vertical frame elements). These frame elements have vertical recesses in a face thereof that faces the closure unit, the recesses being configured and dimensioned for receiving corresponding frame-engaging elements of the closure unit. Such engagement between the closure unit and the two vertical frame elements provides a strong resistance to forced opening actions, ensured by the large contact area between the closure unit and the frame elements.

In one of its aspects, the disclosure provides a closure system that comprises a fixed closure frame, a moveable closure unit, one or more first frame-engaging members, one or more second frame-engaging members, and a hinging device, as will be described hereinbelow. Other aspects provide hinging devices, as will be described below. The closure unit and the closure frame that are configured for use in the closure system of this disclosure are other aspects thereof.

The fixed closure frame comprises two opposite vertical frame elements: a first vertical frame element that has a closure-facing surface with one or more recesses defined in the first closure-facing surface, and a second, opposite, vertical frame that has a second closure-facing surface with one or more second recesses defined in the second closure-facing surface. Each of the first and second recesses is configured for receiving, respective, first and second frame-engaging members of the closure unit.

The movable closure unit comprises first and second opposite vertical edges facing, respective, the first and second opposite vertical frame elements. The closure unit is operable in an opening sequence between a closed position, an intermediate position, and an open position (and in reverse closing sequence from the open position, through the intermediate position, to the closed position), as will be described below. The closure unit has one or more first frame-engaging members defined in said first vertical edge and is configured for fitting into the one or more first recesses, such that the one or more first frame-engaging members are substantially fully received within the first recess therein when the closure unit is in the closed position. The closure unit also has one or more second frame-engaging members defined in said second edge, and configured for fitting into the one or more second recesses, such that the one or more second frame-engaging members are at least partially received within said one or more second recesses when the closure unit is in the intermediate position, while the one or more first frame-engaging members are outside said one or more first recesses.

The closure unit is coupled to the second frame element by one or more hinging devices, at times 2, 3, 4 or more such devices. Each hinging device is configured to permit (i) a linear displacement of the closure unit along a linear path that is defined between the two opposite vertical frame elements in a span between the closed position and the intermediate position, and (ii) a pivotal movement of the closure unit between the intermediate position and the open position about a pivot axis in the hinge device, the pivot axis being oriented in the general direction of said second frame element. The one or more second frame-engaging members and the one or more second recesses are shaped and/or dimensioned to permit the closure unit's rotation between the intermediate position and the open position. The configuration of the hinging device enables said opening sequence and the reverse closing sequence.

The first and second frame elements and the corresponding first and second edges are, typically, vertically oriented—such that the sliding from the closed to the intermediate position is horizontal (i.e. sideways in the plane defined by the closure unit) and the change in position from the intermediate to the open position is through rotation about the vertical pivot axis defined by the hinge device. However, this does not exclude other arrangements, where said second edge and said second frame element are horizontal, e.g. being the top frame element and edge, with said sliding from the closed to the intermediate position being vertical (i.e. up or down) and the change in position from the intermediate to the open position is through rotation about a horizontal pivot axis.

By an embodiment of this disclosure, the frame-engaging member, in at least one of the first or second edges, extends along a length of the edge, with respective recesses extending along substantially the same length in the respective frame element. Typically, but not exclusively, one or both edges have a single frame-engaging member that extends along substantially the entire length of the respective edge, with a respective recess extending along substantially the same length in the respective frame element.

By another embodiment of this disclosure, the closure system comprises one or more protrusions within the one or more first recesses configured to be received within one or more corresponding sockets within the first frame-engaging member. For example, said one or more protrusions may be one or more pins.

By one configuration of this disclosure (to be referred to as the "first hinge configuration"), the hinging device comprises a housing holding a rotatable element, rotatable between a first angular state and a second angular state; and comprises a plunger coupled to the rotatable element at a proximal end thereof. The housing is attached to one of the second frame element and the second edge of the closure unit, while the other distal end of the plunger is attached to the other of the second frame element and the second edge of the closure unit. The term "attached" denotes, attached, fixed, connected, linked, secured, etc., and the various derivation of this term denote also the corresponding derivations. Attaching may also be through integrating the respective element into or within the frame element or the edge of the closure unit in any suitable manner.

The plunger is capable of reciprocating in a plunger axis between an extended state and a retracted state, defining a plunger gauge therebetween, the plunger gauge being at least the same as said span to permit the closure's displacement between the closed and intermediate positions. In the first angular state of the rotatable element, the plunger axis is parallel to said path and permits the linear displacement. The rotatable element may be configured such that it is blocked from rotation while the plunger is not in its retracted state, the rotation being enabled once the plunger is at said retracted state.

The plunger may be cylindrical, prismatic or may have a variety of different other cross-sectional shapes, including elliptic, trapezoid, and many other regular or irregular cross-sectional shapes.

The hinging device of the first configuration may comprise an urging element, configured for urging the closure unit to linearly displace away from the second frame element. By one embodiment, such an urging element is comprised within the plunger, urging the plunger into the extended state. In other embodiments, the urging elements is an element separate from the plunger or even an independent element, separate from the hinging device.

By an embodiment of this configuration, the plunger is blocked from displacement into the extended state when the rotatable element is not in the first angular state. In the presence of an urging member as noted above, such an arrangement may yield a semi-automatic closure sequence: the closure unit may be manually pushed from its open position towards its intermediate position, and once in said intermediate position linear displacement of the plunger from its retracted to its extended state is enabled and through the urging of the urging member linearly displaces the closure unit to the closed position. By an embodiment, the plunger has a body with a main portion fitting into a bore defined in the rotatable element and fully received therein when in the retracted state. The body has a neck portion at the closure end of the plunger, the neck portion being narrower than the main portion and extends out of the bore when the plunger is in said retracted state. The housing has a circumferential track, being defined between two housing elements, the track being dimensioned to permit rotation in the retracted state of the plunger and blocking the rotation in the extended state of the plunger. Typically, the track has a width that is the same or wider than said neck portion, but narrower than said main portion. The arrangement of this embodiment also blocks displacement of the plunger into the extended state when in an angular position different than the first angular position.

By another configuration of this disclosure (to be referred to as the "second hinge configuration"), the hinging device comprises a vertical hinge element that is connected to the second vertical frame element, and has two cylindrical portions that flank a beam portion. The bean portion has two parallel vertical faces, that are parallel to the linear path when the closure unit is in the closed position. The hinging device of the second configuration further comprises a hinge coupling member connected to the closure unit at its one side opposite said member's peripheral side.

The hinge coupling member has a channel that is located opposite the beam portion, the channel having a peripheral section extending from the peripheral side and being of a width corresponding to a distance between said two parallel vertical faces, whereby the channel is slidable over said beam portion. The channel also has an inner portion defined by a vertical bore with dimensions corresponding to those of the vertical hinge element, whereby once aligned with the hinge element, the coupling member is capable of rotating about the vertical hinge element. The hinge coupling member also comprises a pin housed within the channel and urged against the vertical hinge element.

In the closed position, the peripheral section of the channel is positioned over said beam portion, in which position rotation is blocked. Upon linear movement of the closure unit into the intermediate position, the bore section of the channel becomes aligned with the vertical hinge element, thereby enabling rotation of the closure unit into the open position.

In order to facilitate ease of linear displacement when the closure unit is displaced from the closed position to the intermediate position (and vice versa), an association arrangement is provided between a frame header and a top surface of the closure unit. Such association arrangement functions to guide the linear displacement of the closure unit along the linear path. Thus, by an embodiment, a top end of the closure unit is releasably associated through an association arrangement to a frame header (i.e. a substantially horizontal beam linking the top ends of the vertical frame elements), to thereby support the closure unit during said linear displacement, the association arrangement being configured to permit release of the closure unit therefrom when in the intermediate position.

By an embodiment, the association arrangement comprises one or more one or more first association member downwardly projecting from the frame header, and corresponding one or more second association members formed at a top surface of the closure unit. Each of the one or more first association members has a shaft and a head portion broader than the shaft, and each second association member defined an L-shaped slot with its upper part dimensioned to permit passages therethrough of the track while retaining the head portion within the slot, one leg of the L-shaped slot being open to permit disassociation or reassociation with the first association member when the closure unit is in the intermediate position. In other words, the L-shaped slots are shaped and dimensioned to receive and retain the head portions of the first association members within the slot when the closure unit is at the closed position and during transition between the closed and intermediate positions.

By an embodiment, the opening of the L-shaped slot is below a plane defined by the other leg of the L-shaped slot.

In other words, the L-shaped slot has two legs: a first leg of the L-shaped slot being the section of the L-shaped slot that extends along to the linear path, and a second leg that is angled to the first leg and terminates with said opening. The second leg, in this embodiment, defines an inclination between the opening and the connection point to the first leg, thereby the opening is located below a plane defined by the first leg. In such an arrangement, when the closure unit is rotated from the closed position to the intermediate position, the opening is brought into alignment with the first association member, and pushed along the upward slope of second leg of the L-shaped slot during the rotation of the closure unit. When reaching the connection point to the first leg, the closure unit is urged by the biasing member of the hinge to displace in the linear path along the first leg of the L-shaped. As opening is below the place of the first leg of the L-shaped slot, the movement from the opening to the connection point to the first leg effectively raises (i.e. slightly vertically displaces) the closure unit, thereby causing the closure unit to at least partially "hang" from the association arrangement. Such an arrangement enables distribution of loads between the hinge device and the association arrangement when the closure unit is in the closed position.

As noted above, provided by other aspects of this disclosure are (i) a closure frame configured for use in a closure system as described herein, (ii) a closure configured for use in a closure system as described herein, (iii) a hinging device according to the first configuration configured for use in a closure system as described herein; and (iv) a hinging device according to the second configuration for use in a closure system as described herein.

The hinging device, according to an embodiment of this disclosure, is attachable to a frame element and to an edge of a closure unit, thus coupling the two. It is configured to permit (i) relative linear displacement of the closure unit between a closed position, in which said edge is distanced from said frame element, and an intermediate in which said edge and said frame element are proximal to one another, and permit (ii) pivotal movement of the closure unit about a pivot axis between said intermediate position and an open position.

The hinging device of the first configuration may, by some embodiments, comprise a housing, attachable to one of the second frame element and the second edge of the closure unit, holding a rotatable element that is rotatable between a first angular state and a second angular state; and comprises a plunger coupled to the rotatable element at its proximal end and attachable, at its other, distal end, to the other of the second frame element and the second edge of a closure unit, the plunger being reciprocable in a plunger axis between an extended state and a retracted state, defining a plunger gauge therebetween, that defines a span of said linear displacement.

By an embodiment of this configuration, in the first angular state said linear displacement is enabled and the rotatable element is blocked from rotation, the rotation towards the second angular state being enabled when the plunger is in a retracted state. The arrangement may also be such that upon rotation into a state other than the first angular state, the displacement of the plunger into the extended state is blocked.

The plunger may comprise an urging element, urging the plunger into the extended state.

By a specific embodiment of the first configuration, the plunger has a body with a main portion fitting into a bore defined in the rotatable element and fully received therein when in the retracted state; the body has a neck portion, narrower than the main portion, at its distal end that extends out of the bore in said retracted state. The housing has a circumferential track, defined between two housing elements, that is dimensioned to permit rotation in said retracted state and blocking the rotation in said extended state. The track has, typically, a width that is the same or wider than said neck portion but narrower than said main portion.

The hinging device of the second configuration comprises a vertical hinge element connectable to said frame element and having two cylindrical portions flanking a beam portion with two parallel vertical faces; a hinge coupling member connectable to the closure unit at its one side opposite said member's peripheral side, and comprising a channel opposite the beam portion having a peripheral section extending from the peripheral side and being of a width corresponding to a distance between said two parallel vertical faces, whereby the channel is slidable over said beam portion, and having an inner portion defined by a vertical bore with dimensions corresponding to those of said hinge element, whereby once aligned with the hinge element said coupling member is capable of rotating about said hinge element, and a pin housed within the channel and urged against the vertical hinge element; in the closed position the peripheral section is positioned over said beam portion in which rotation is blocked, upon linear movement of the closure into the intermediate position said bore section is aligned with said hinge element whereupon rotation into the open position is enabled.

The closure system of this disclosure may incorporate a locking arrangement, such as a bolt or another locking arrangement in an inner side of the closure unit, an electronic, code-operated lock, etc.

Also, the manner of engagement between the edges of the closure unit and the frame elements ensures a higher resistance to break-ins.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

In the attached drawings, that will be described below, embodiments of this disclosure are schematically illustrated. In these embodiments, the closure unit is a door, and the frame is a door frame. It is clear, however, that the illustrated embodiments are but examples of the myriad of different closure systems that are enabled by this disclosure.

Moreover, while in the exemplified embodiments the hinging devices couple between a vertical edge and a vertical frame element (and, accordingly, the door's displacement between the closed to the intermediate position is horizontal, or sideways and the pivotal movement between the intermediate and the open position is about a vertical axis defined by the hinging device), it is clear that other embodiments in which the hinging devices couple between a horizontal frame element and the corresponding edge, e.g. the upper frame element and the edge (and, accordingly, the door's displacement between the closed and the intermediate position is a vertical, namely up or down, and the pivotal movement between the intermediate and the open position is about a horizontal axis defined by the hinging device) are also possible in accordance with this disclosure.

Reference is first being made to FIGS. 1A-4D, which show a closure system with a hinge device according to an embodiment of the first configuration.

Figure 1A:
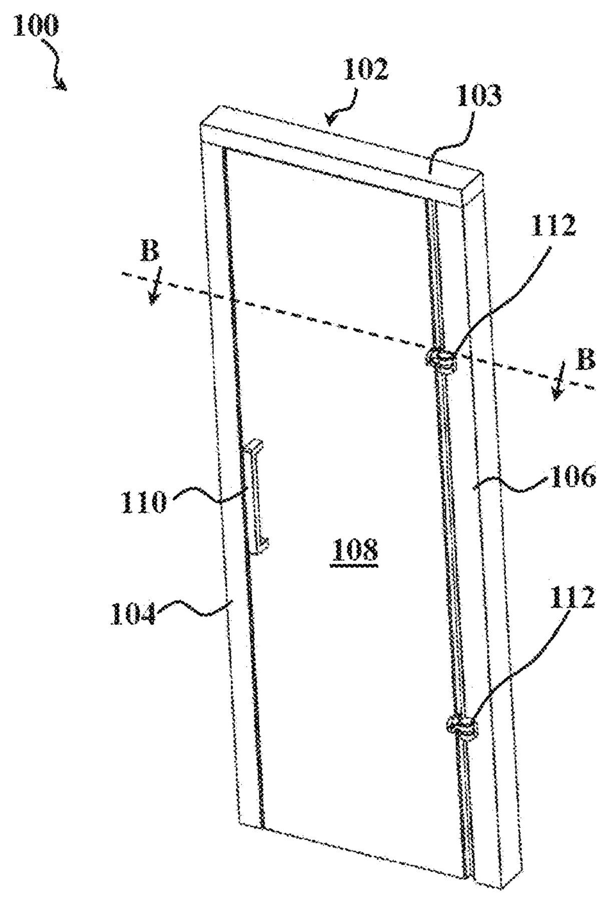
FIGS. 1A-1B are a general view (FIG. 1A) and a cross section along line B-B (FIG. 1B), of a closure system according to an embodiment of the first configuration of the hinge of this disclosure in a closed position.
Figure 1B:
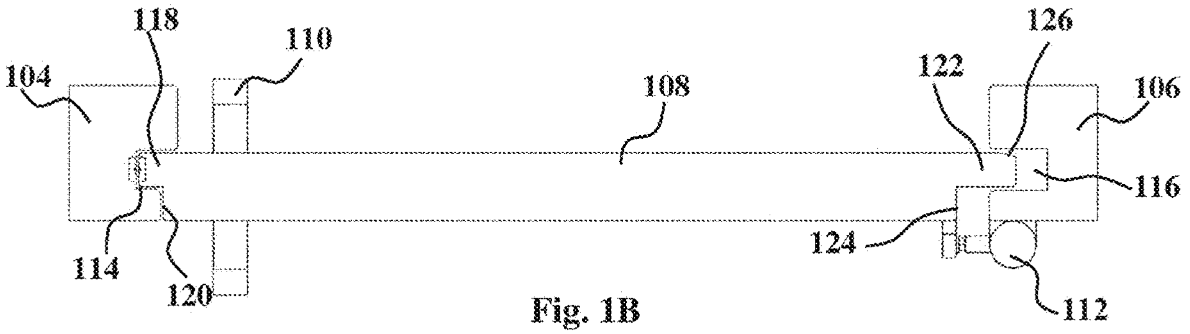
Figure 1C:
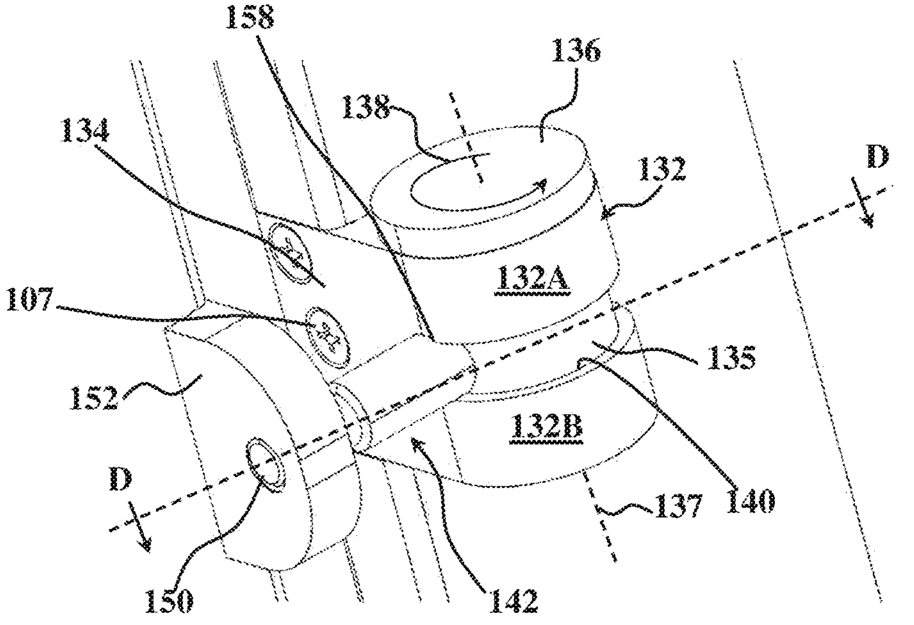
FIGS. 1C-1D are a perspective view (FIG. 1C) and a cross section along line D-D (FIG. 1D), of the hinging device of the first configuration in a closed position.

FIGS. 1A-1B show a closure system generally designated 100, that includes a frame 102, with a frame header 103, a first vertical frame element 104 and a second vertical frame element 106, a closure unit 108, in this case a door, with two handles 110 (one on each side of door 108). The door 108 is coupled to second vertical frame element 106 through a pair of hinging devices 112.

First vertical frame element 104 comprises a first recess 114 and second vertical frame element 106 has a second recess 116. Door 108 has a first frame-engaging member 118 defined in first vertical closure edge 120 and a second frame-engaging member 122 defined in second, opposite vertical closure edge 124. The frame-engaging members 118 and 122 are configured for fitting into the corresponding recesses 114 and 116, respectively. Second frame-engaging member 122 is slightly narrower than the width of second recess 116, and has a slanted facete 126 that permits the angular rotation of the door in the manner to be described below.

Frame-engaging members 118 and 122 extend, in this example, along the entire vertical edges 120 and 124, respectively, and the respective recess 114 and 116 substantially extend the entire length of the vertical frame elements. It should, however, be notes that in other embodiments, there may be two or more corresponding first and second frame-engaging members-recess couples.

Figure 2A:
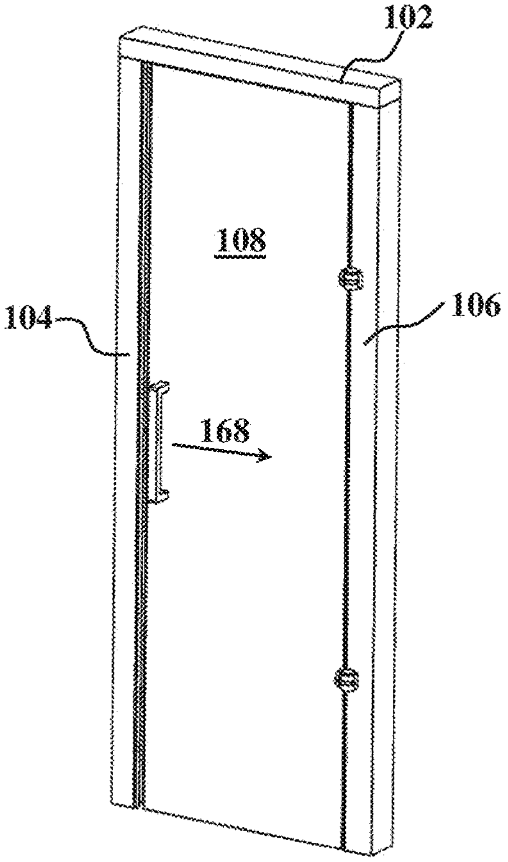
FIGS. 2A-2D are the same views of the closure system of FIGS. 1A-1D, respectively, with the closure unit at the intermediate position.
Figure 2B:
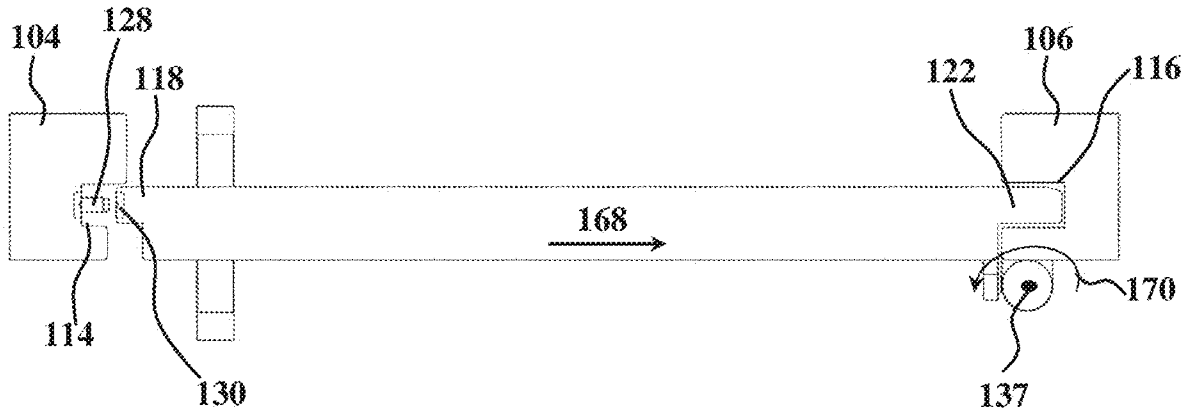
Figure 2C:
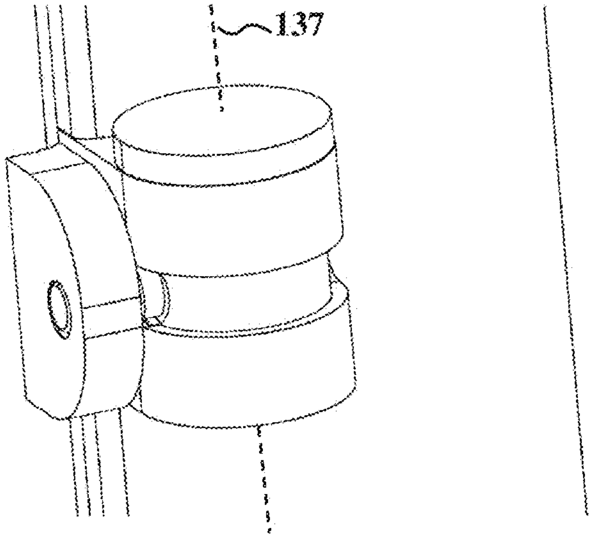
Figure 3A:
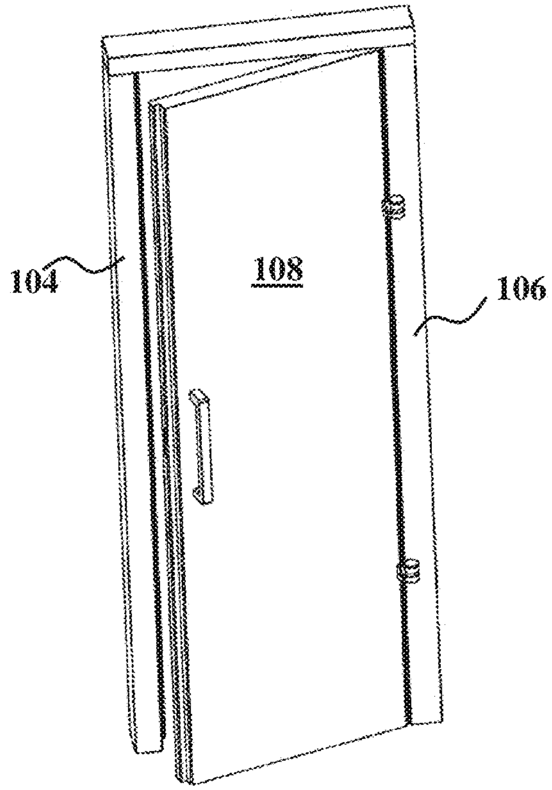
FIGS. 3A-3D are the same views of the closure system of FIGS. 1A-1D, respectively, with the closure unit being at the partially opened position.
Figure 3B:
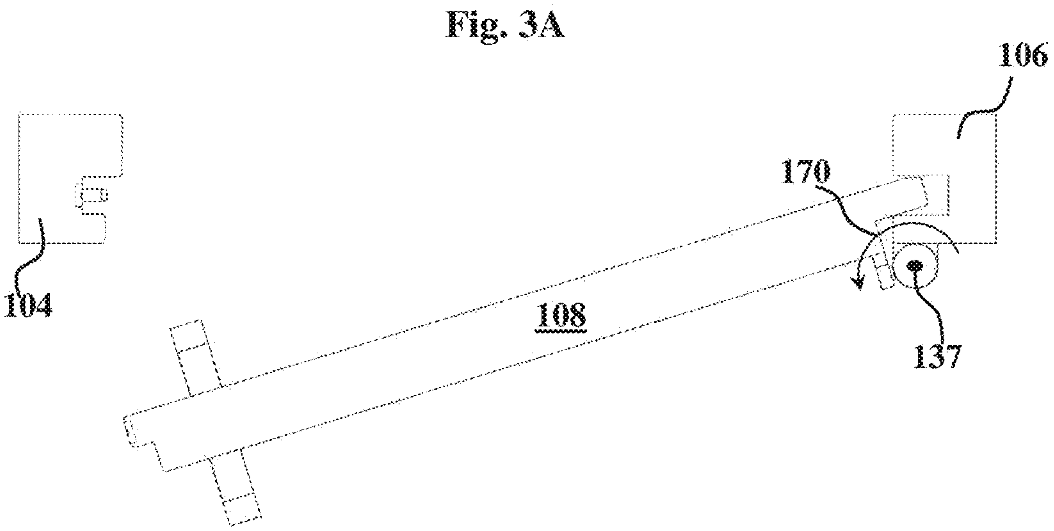
Figure 3C:
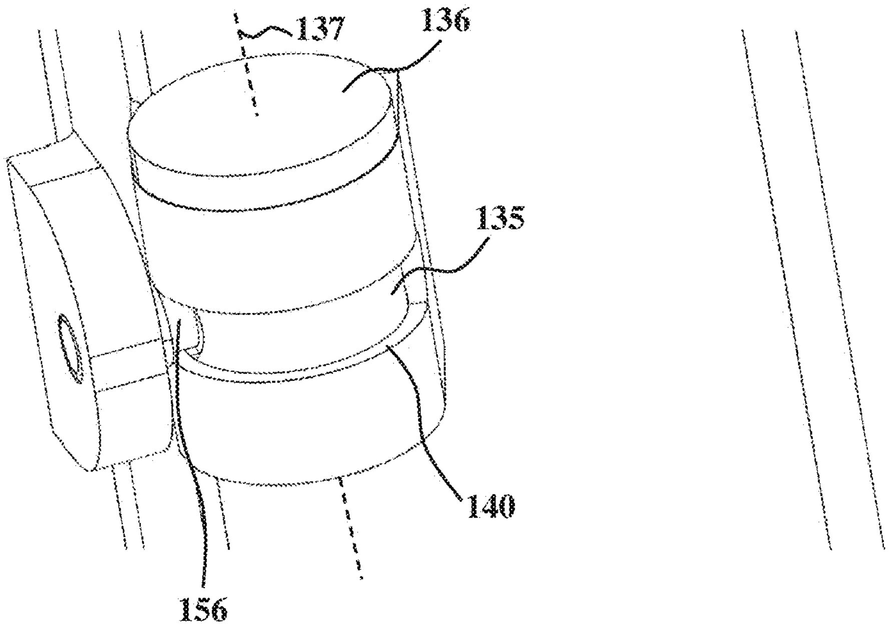
Figure 3D:
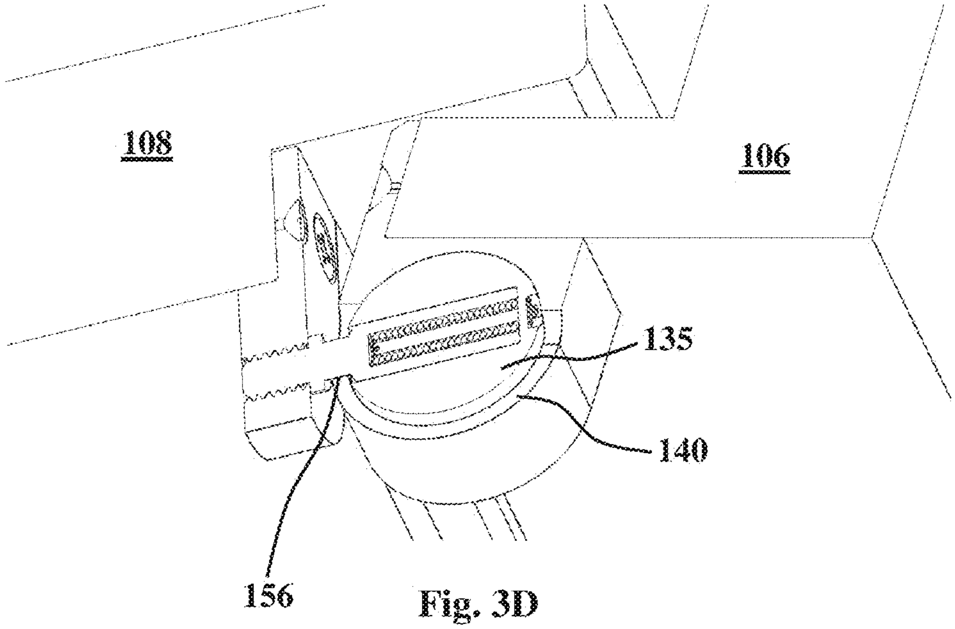
Figure 4A:
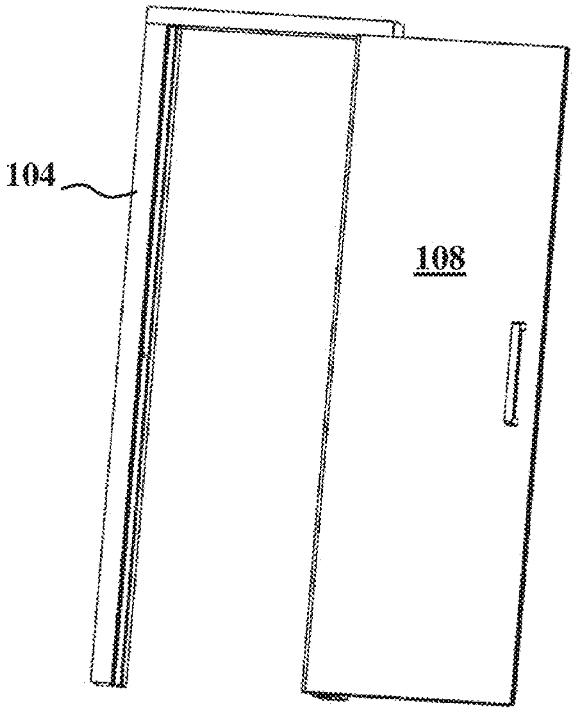
FIGS. 4A-4D are the same views of the closure system of FIGS. 1A-1D, respectively, with the closure unit being at the fully opened position.
Figure 4B:
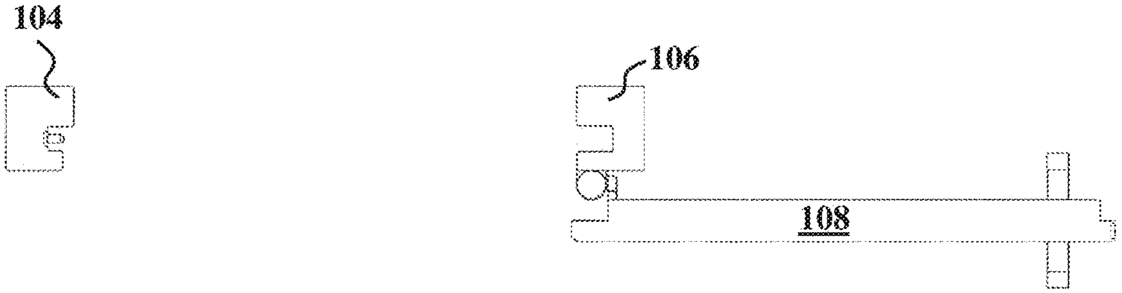

First recess 114, as can best be seen in FIGS. 2B, 3B and 4B, has a pin 128 projecting towards first vertical edge 120, and can be received in a pin-receptable 130 formed in the first frame-engaging member 118.

Hinging device 112 has a housing 132 connected to the second vertical frame element 106 by a fixing element 134, fixed to vertical frame element 106 by means of screws 107, and houses a cylindrical member 135 of a rotatable element 136 that is capable of rotation counterclockwise about pivot axis 137 in an angular direction represented by angular arrow 138. Housing 132 has a track 140 defined between two housing elements 132A and 132B.

Figure 1D:
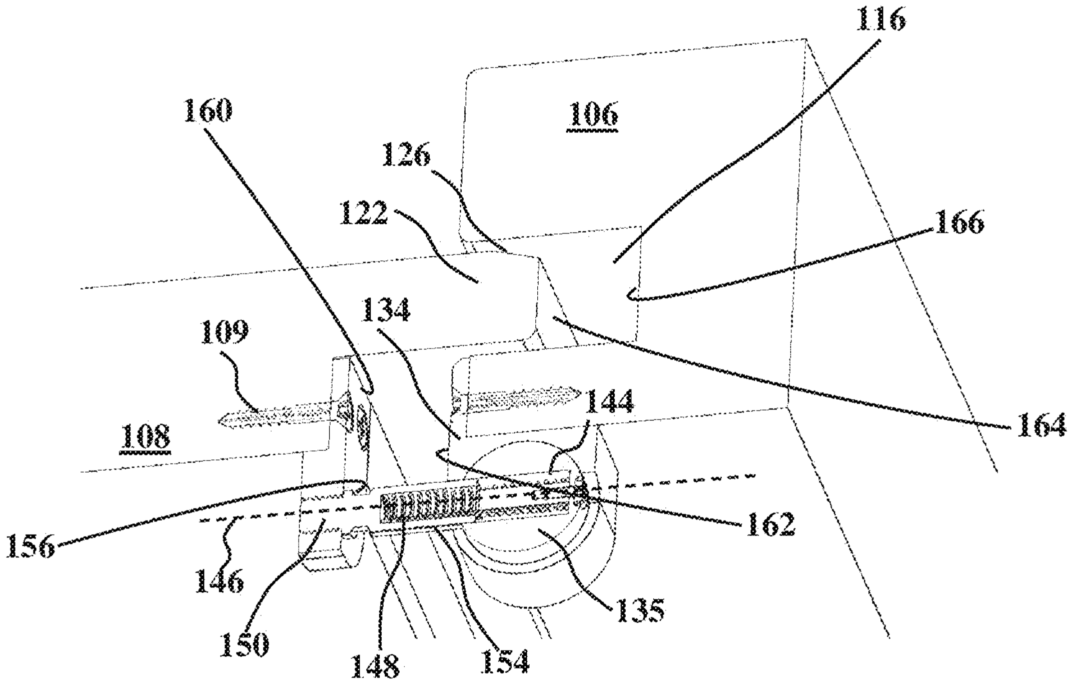
Figure 2D:
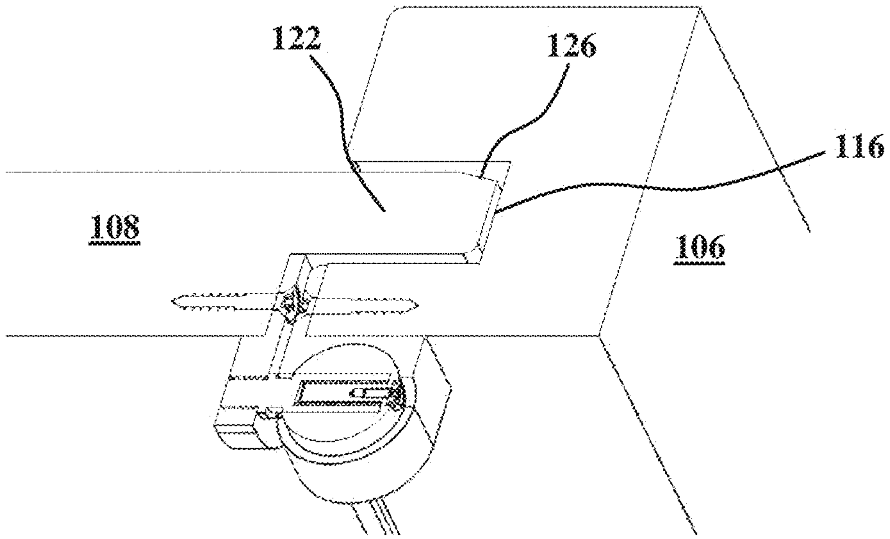
Figure 4C:
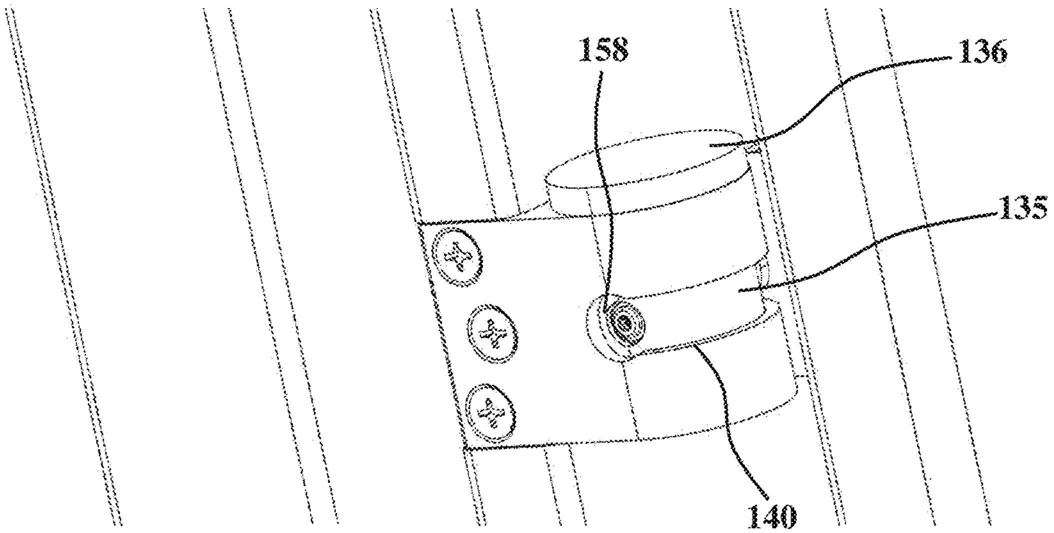
Figure 4D:
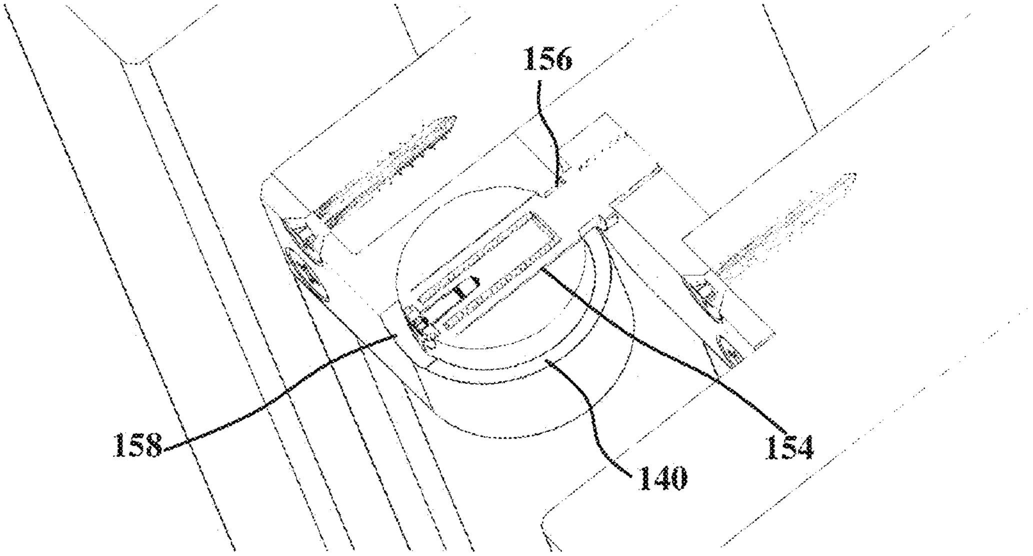

Coupled to cylindrical member 135 is a plunger 142 received within a bore 144 defined in the cylindrical member 135, the plunger 142 can be displaced between an extended state shown in FIG. 1D and a retracted state shown in FIG. 2D, along a plunger axis 146, to define a plunger gauge, and which is urged into the extended state by an urging member, i.e. helical spring 148. Plunger 142 is fixed at a closure end 150 thereof to a fixing element 152 that is fixed to the second vertical edge 126 of door 108 by means of screws 109. The plunger 142 has a body 154 that is configured to be received within bore 144, and a narrower neck 156. When plunger 142 is the retracted state, seen in FIG. 2D, the body 154 is fully received within bore 144, with the narrower neck 156 being retained outside of the bore. The end segment 158 of track 140, is wider than the remainder of the track (as is best illustrated in FIGS. 4C-4D) and of a diameter permitting the reciprocal displacement of the plunger's body 154 and hence that of the entire plunger 142. Other segments of track 140 are narrower and of a width smaller than that of body 154 but slightly wider than that of neck 156. Accordingly, as long as body 154 is not fully received within bore 144, the rotatable element 136 is blocked from rotation. Once fully received, the neck 156, which has a length substantially equal to the width of the track, comes to lie within the track when rotation is enables, as can best be seen in FIGS. 3C-3D and 4C-4D.

FIGS. 1A-1D, 2A-2D, 3A-3D and 4A-4D show the closure system in different operational sequence steps that will now be explained. In FIGS. 1A-1D the closure unit is in its close position, in which frame-engaging member 118 is fully received within recess 114, with pins 128 being fully received within pin-receptables 130; while second frame-engaging member 122 is partially received within second recess 116. As can be seen in these figures, there is a clearance between the opposite faces 160, 162 of fixing elements 154, 152 and a corresponding clearance between the end face 164 of the second frame-engaging member 122 and the internal face 166 of second recess 116. This clearance is substantially the same as said plunger gauge.

In a first step of the operation sequence, represented in FIGS. 2A-2D, the door is linearly displaced in a direction parallel to door's plane, a direction represented by arrow 168, causing the plunger to displace into its retracted state, as can be seen in FIG. 2D, causing the first frame-engaging member 118 to displace outside the first recess 114 and the second frame-engaging member 122 to be substantially fully received within second recess 116. As can be seen in FIGS. 2B and 2D, the width of the second frame-engaging is narrower than that of the second recess and this fact, together with the slanted facet 126 permit the rotation about the pivot axis in a counterclockwise rotation, represented by angular arrow 170 in FIGS. 2B and 3B, to permit rotation into the open position, shown in FIGS. 3A-4D.

FIGS. 3A-3D show the door in a partially opened position while FIGS. 4A-4D show the door in a fully opened position. Once the plunger is in its fully depressed position, neck 156 lies within track 140, whereupon the rotatable element 136 is free to rotate about axis 137 permitting to open the door. As shown in FIGS. 3A-4D.

When the door 108 is in partially open or fully open position the rotatable element 136 is in a state other than its first angular state of FIGS. 1A-2D, the plunger body 156, which has a diameter wider than the width of track 140 cannot move out of bore 144 and, consequently, the plunger is locked in its retracted state.

The sequence for closing is opposite to that described. The door 108 is rotated from its open position (FIGS. 3A-4D) to the intermediate position (FIGS. 2A-2D), whereupon the plunger 142 can displace to its extended state and the door can be manually displaced to its closed position (FIGS. 1A-1D) or this may be achieved automatically by the urging force of spring 148.

FIGS. 5A-7B show a closure system with the hinge device of the second configuration according to an embodiment of this disclosure.

Figure 5A:
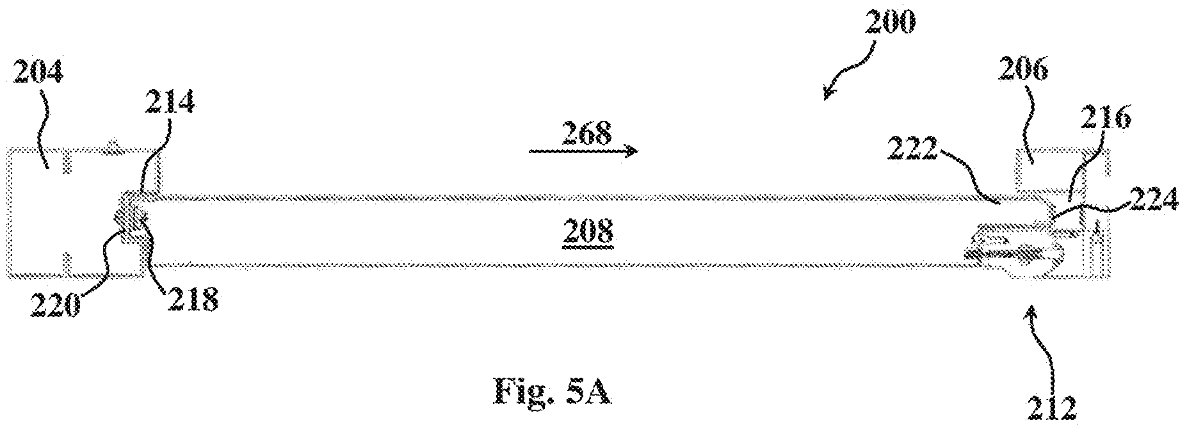
FIGS. 5A-5B illustrate a closure system with the second configuration of the hinge according to an embodiment of this disclosure in the closed position: a transverse cross-sectional view of the closure system (FIG. 5A), and a close-up cross-sectional view of the hinge device (FIG. 5B).
Figure 5B:
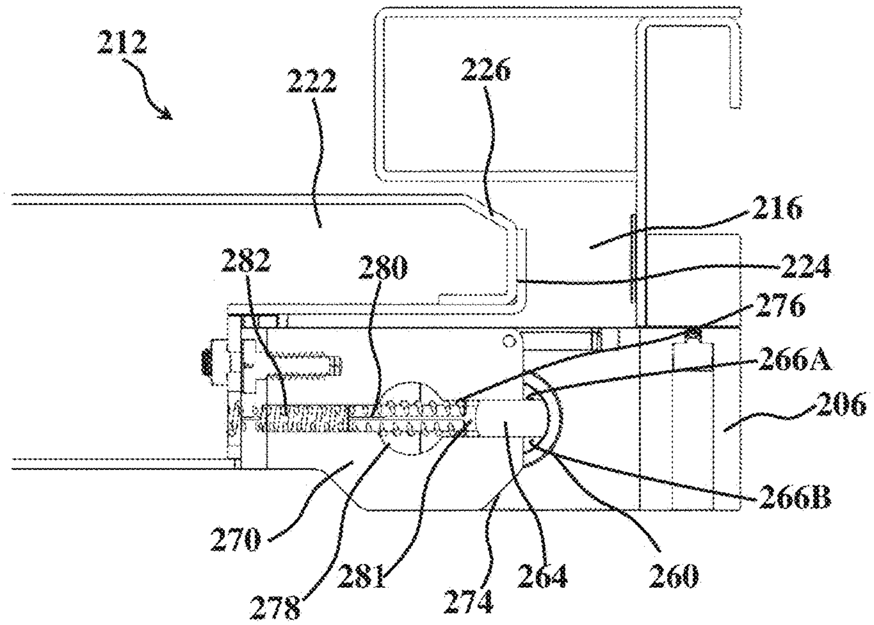

FIGS. 5A-5B show a closure system generally designated 200, that includes a frame with a first vertical frame element 204 and a second vertical frame element 206, a closure 208, in this case a door. Door 208 is coupled to second vertical frame element 206 through a pair of hinging devices 212, one of which being shown in FIGS. 5A-7B.

First vertical frame element 204 comprises a first recess 214 and second vertical frame element 206 has a second recess 216. Door 208 has a first frame-engaging member 218 defined in first vertical closure edge 220 and a second frame-engaging member 222 defined in second, opposite vertical closure edge 224. The frame-engaging members 218 and 222 are configured for fitting into the corresponding recesses 214 and 216, respectively. Second frame-engaging member 222 is slightly narrower than the width of second recess 216, and has a slanted facete 226 that permits the angular rotation of the door in the manner to be described below. The function of the frame engaging members and the recesses are similar to those described in connection with the embodiments of FIGS. 1A-4C, where elements having similar function have the same reference numerals less 100 (for example, element 204 in FIG. 5A is functionally similar to element 104 in FIG. 1A).

The hinge device 212 of this embodiment of the second configuration has a vertical hinge element 260 (best seen in FIG. 5C) that is connected to the second vertical frame element 206, and has two cylindrical portions 262A and 262B flanking a beam portion 264, seen in cross-section in FIG. 5B. The beam portion 264 has two parallel vertical faces 266A and 266B, that are arranged parallel with the linear path represented by arrow 268 in FIGS. 5A-5B, along which the door is displaced between the closed position and the intermediate position.

The hinge device 212 further includes hinge coupling member 270 that is connected at its one side 272 to the closure unit 208 and at its opposite peripheral side 274 to the vertical hinge element 260. The hinge coupling member 270 has a channel 276 that is opposite the beam portion 264 and extends from the peripheral side 274, and has a width that corresponds to the distance between said two parallel vertical faces 266A and 266B. Consequently, channel 276 is slidable over said beam portion 264 during the transition between the open position to the intermediate position, and vice versa. Channel 276 has an inner portion 278 defined by a vertical bore of dimensions that correspond to those of the two cylindrical portions 262A and 262B of the vertical hinge element 260. Once aligned with the vertical hinge element in the intermediate position, hinge coupling member 270 can rotate about the vertical hinge element 260.

Housed within channel 276 is pin 280, with a pin head 281 that is urged by means of spring 282 against the vertical hinge element 260. Displacing the closure unit 208 into the intermediate position is against the biasing force of spring 282.

Figure 5C:
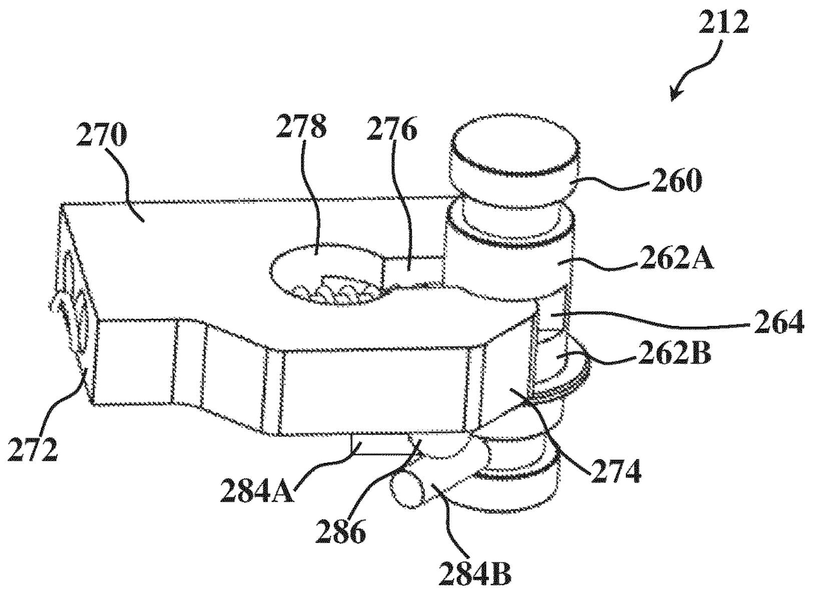
FIG. 5C shows the hinge device of FIGS. 5A-5B in isolation.
Figure 6A:
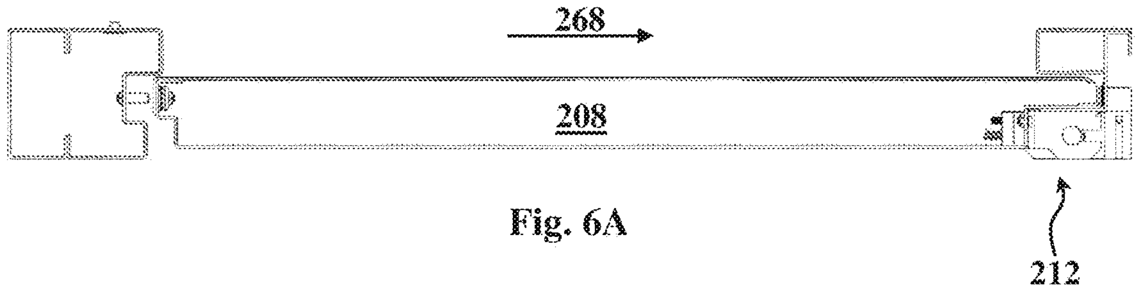
FIGS. 6A-6B show the closure system of FIGS. 5A-5B in the intermediate position in corresponding views.
Figure 6B:
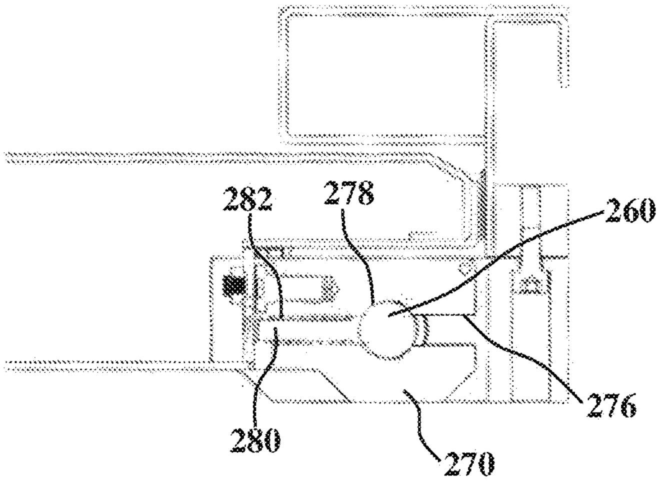
Figure 7A:
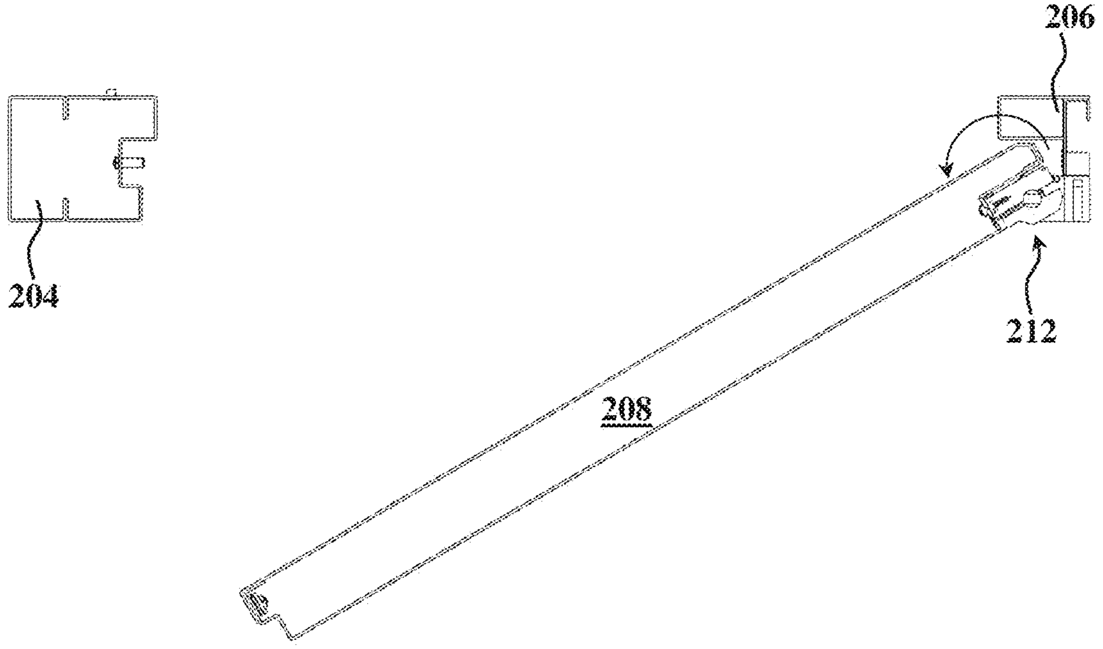
FIG. 7A-7B show the closure system of FIGS. 5A-5B in the open position in corresponding views to those of FIGS. 5A-5B.
Figure 7B:
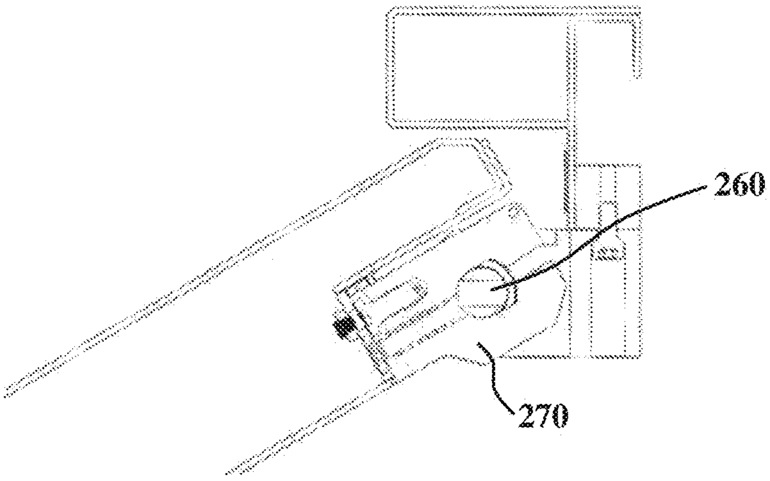

As can be seen in FIG. 5C the hinge device 212 has a number of support pins, two of which 284A and 284A can be seen, that support a ball 286 to constitute a ball-bearing arrangement to provide for a relatively friction free rotational movement from the intermediate position to the open position and vice versa.

The linear displacement of closure unit 208 from the closed position to the intermediate position is along a linear path generally designated by arrow 268 similar to the displacement described above in connection with FIGS. 1A-4C. This, as noted above, is against the bias of spring 282. Once in the intermediate position, inner portion 278 of channel 276 co-axially aligns with the hinge element 260 to thereby permit rotation from the intermediate position to the open position shown in FIGS. 7A-7B.

Shown in FIGS. 8A-8F is an association arrangement that associates between the closure unit and a frame header that supports the closure unit during its linear displacement and is configured to permit release of the closure unit from the frame header in the intermediate position, and re-association once the closure unit is rotated from the open position to the intermediate position. In this specific embodiment there are two such arrangements (300A and 300B) that include elements in the closure unit 308 and frame header 303 that links between vertical frame elements 304 and 306.

Figure 8A:
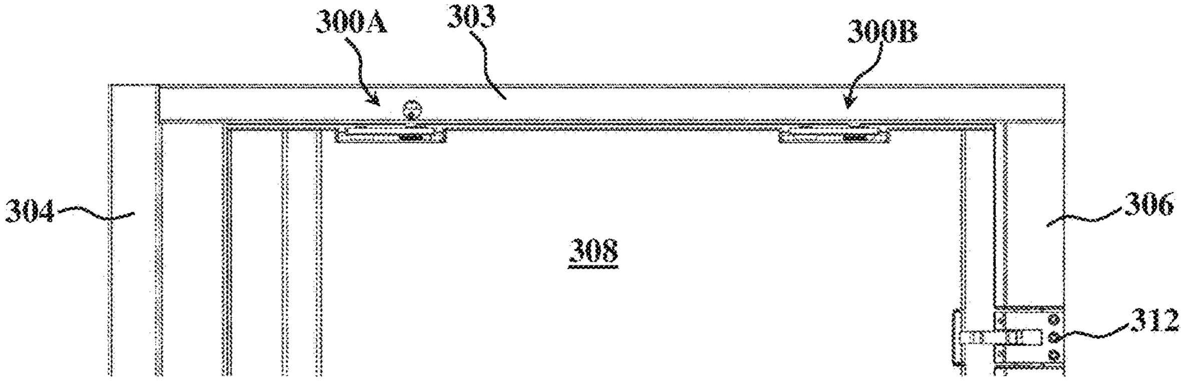
FIGS. 8A-8F show a closure system according to an embodiment of this disclosure, with an association arrangement of the closure with the frame header: front view of the top portion (FIG. 8A), upper elevational view of the top portion in the closed position (FIG. 8B), upper elevational exploded view (FIG. 8C), top view in the closed position (FIG. 8D), top view in the intermediate position (FIG. 8E), a top view in the open position (FIG. 8F)—with the header frame being removed from FIGS. 8B-8E being removed for ease of view.
Figure 8B:
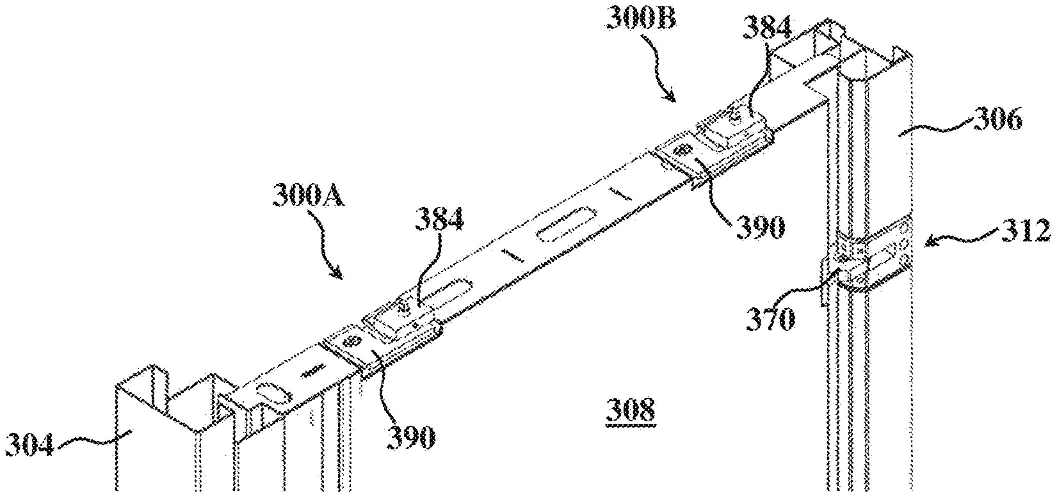
Figure 8C:
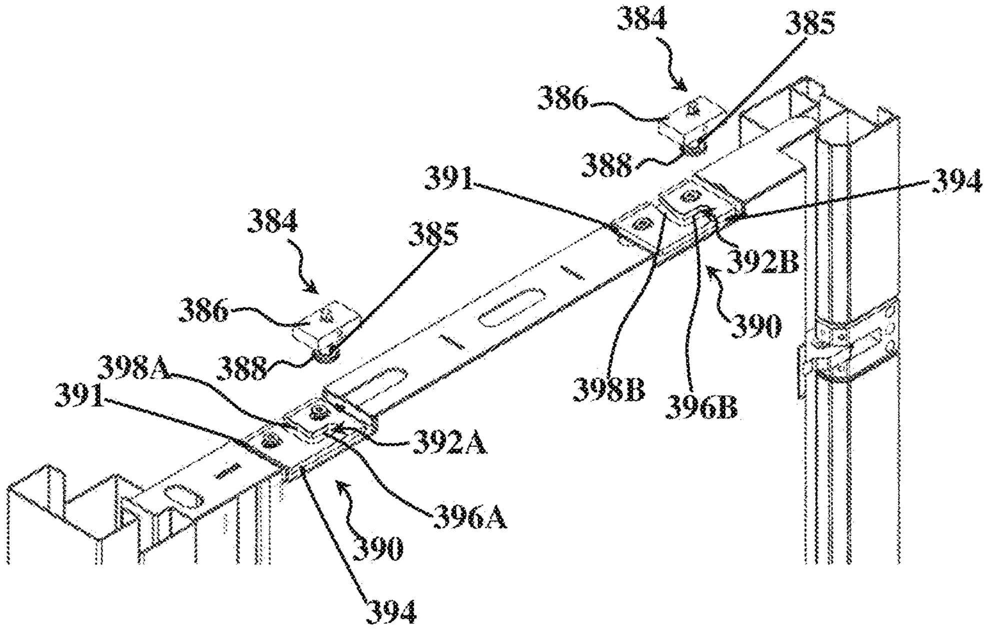
Figure 8D:
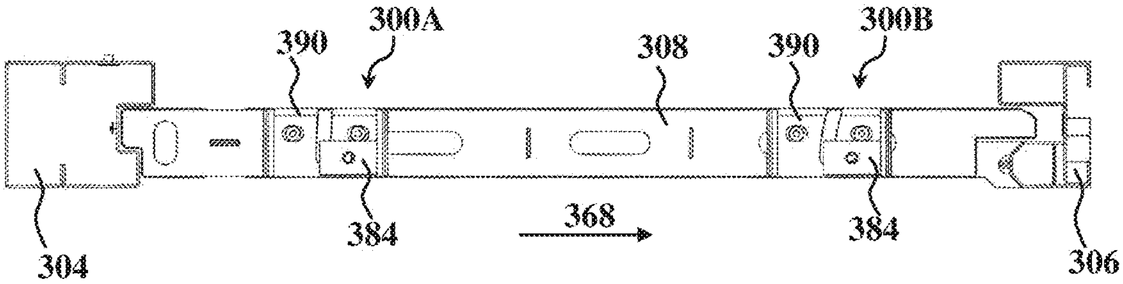

As can be seen in FIGS. 8B-8D, association arrangements 300A, 300B include each a first association member 384 that has a downwardly projecting member 385 anchored in frame header 303 through an anchoring element 386. The first association member 384 has a shaft, ending with a head 388. Each of the association arrangements 300A and 300B has a corresponding second association member 390 that is fitted into a recess 391 in the upper surface of the closure unit 308 and includes an L-shaped slot 392, that has a first leg 396 parallel to arrow 368 that represents the direction linear displacement between the closed and the intermediate positions, and a second leg 398 angled thereto. Thus, association arrangements 300A and 300B have corresponding L-shaped slots 392A and 392B, with corresponding first legs 396A, 396B and second legs 398A, 398B. While the first legs 396A and 396B are essentially the same, the angle between them and their respective second legs 398A and 398B is different (as can best be seen in FIGS. 8D-8F). The significance of this difference will be described below.

Second association member 390 is fitted into recess 391 in a manner that leaves a space 394 between the lower face of member 390 and the upper face of recess 391. Slot 392 has a width such to permit the shaft of first association member 384 to pass therethrough, but is narrower than the head 388, which when member 384 is coupled with the second association member 390 its shaft slides along the L-shaped slot 392 while the head 388 is retained in space 394. Obviously, space 394 is configured to have a span larger than that of head 388.

In the embodiment shown in FIGS. 8A-8F, the closure unit 308 is fitted to vertical frame element 306 by means of a hinge device 312 of the second hinge configuration; but, as can be appreciated, this is not limited thereto, and can also be used with a hinge of the first configuration or any other hinge device with the general features disclosed herein.

Figure 8E:
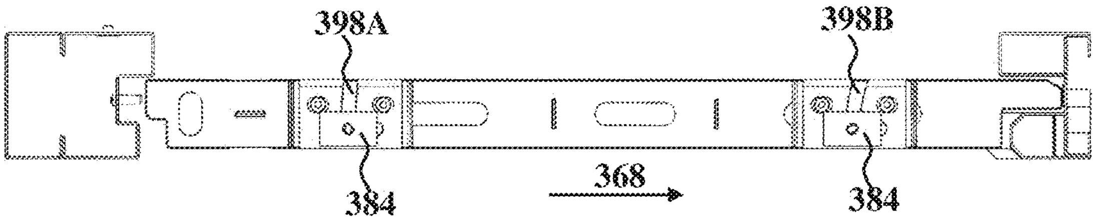
Figure 8F:
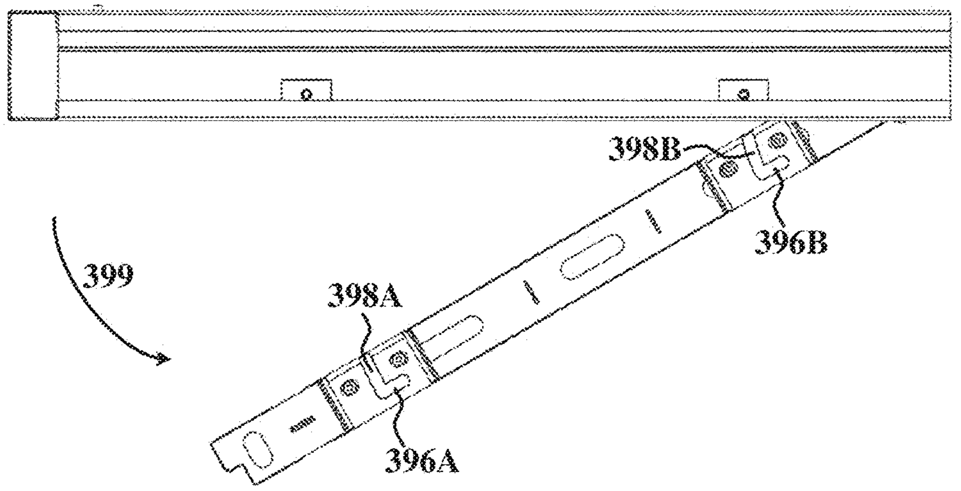

When in the closed position, seen in FIGS. 8A-8D closure unit 308 is engaged with vertical recesses in the vertical frame elements in a manner similar to that of the engagement of closure 108 seen in FIGS. 1A-1B. When linearly displaced in the direction of arrow 368 (FIG. 8E) from the closed position to the intermediate position, first legs 396A, 396B slide over the shafts of the stationary first association members 384. The length of first legs 396A, 396B is the same as the span of linear displacement between the closed position (FIGS. 8A-8D) and the intermediate position (FIG. 8E).

When in the intermediate position, the shafts of first association members 384 are positioned at the junction between the first legs 396A, 396B and second legs 398A, 398B; when rotating the closure unit 308 between the intermediate position (FIG. 8E) into the open position (FIG. 8F) in the direction of arrow 399, in which second legs 398A, 398B slide over the shafts of the first association members 384 to permit disassociation of the first association members from the second association members through openings at the end of the second legs. Second legs 398A, 398B are angled to correspond to the tangent or arc of rotation, which depends on the distance of the association arrangement from the axis of rotation—hence the difference in angle between legs 398A and 398B with respect to legs 396A and 396B.

In a closing sequence, when the closure unit 308 is displaced from the open to the intermediate position, the first association members can be reassociated with the second association members, with the heads 388 entering spaces 394.

The association arrangement can have a number of functions. First, it provides additional anchor points between the closure unit and the frame, and hence an added security measure. Additionally, in case the slots 392 and the corresponding heads 388 have a properly aligned respective elevation, the association arrangement may provide an extra gravitational support to the closure unit 308, to thereby reduce load off the hinge devices 312. By an example, the lower face of second association member 390 is configured such that the portion adjacent to the openings has a slightly higher elevation than that adjacent the inner end of second legs 398, whereby when associated, this configuration causes the closure unit to slightly lift to reduce load from the hinging devices.

The invention claimed is:

1. A closure system having a fixed closure frame and a moveable closure unit, wherein the fixed closure frame comprises a first vertical frame element having a first closure-facing surface with one or more first recesses defined in said first closure-facing surface, and an opposite, second vertical frame element, having a second closure-facing surface with one or more second recesses defined in the second closure-facing surface, the movable closure unit comprises first and second opposite vertical edges facing the first and second frame elements, respectively, and movable between a closed position, an intermediate position and an open position, the closure having one or more first frame-engaging members defined in said first vertical edge, and configured to be received into the one or more of the first recesses, such that when the closure is in the closed position the one or more first frame-engaging members are fully received therein, and one or more second frame-engaging members defined in said second vertical edge, and configured to be received into the one or more second recesses, and when the closure is in the intermediate position, the one or more second frame-engaging members are at least partially received within said one or more second recesses, while the one or more first frame-engaging members are outside said one or more first recesses;

the closure unit being connected to the second frame element by one or more hinging devices configured for (i) linear displacement of the closure unit along a linear path and in a span between the two opposite frame elements, between the closed position and the intermediate position, and (ii) a pivotal movement of the closure unit between the intermediate position and the open position about a pivot axis defined by the hinging device;

the one or more second frame-engaging members and the one or more second recesses being shaped and/or dimensioned to permit rotation of the closure from the intermediate position to the open position;

the hinging device comprising a housing attached to one of the second frame element and said second vertical edge holding a rotatable element, rotatable between a first angular state and a second angular state, and a plunger having a proximal end coupled to the rotatable element and a distal end coupled to the second vertical edge of the closure unit, the plunger reciprocating in a plunger axis between an extended state and a retracted state, defining a plunger stroke therebetween, the plunger stroke having a length that is the same as or larger than said span between the two opposite frame elements, in the first angular state of the rotatable element, the plunger axis is parallel to said path permitting the linear displacement of the closure unit between the closed and intermediate positions while the rotatable element is blocked from rotation, said pivotal movement into the second angular state being enabled once the plunger is at its retracted state, and one or more protrusion within the one or more first recesses configured to be received within one or more corresponding sockets within said first frame-engaging members.

2. The closure system of claim 1, wherein the frame-engaging members, in at least one of the first or second vertical edges, extend along a length of the vertical edge, with respective recesses extending along the same length in the respective frame element.

3. The closure system of claim 2, wherein one or both of the vertical edges have a single frame-engaging member extending along the entire length of the respective vertical edge, with a respective recess extending along substantially the same length in the respective frame element.

4. The closure system of claim 1, wherein said one or more protrusions are one or more pins.

5. The closure system of claim 1, comprising an urging element for urging the linear displacement of the closure unit from the intermediate to the closed position.

6. The closure system of claim 1, wherein the plunger comprises an urging element, urging the plunger into the extended state.

7. The closure system of claim 1, wherein the plunger is blocked from displacement into the extended state when the rotatable element is not in the first angular state.

8. The closure system of claim 1, wherein the plunger has a body with a main portion fitting into a bore defined in the rotatable element and fully received therein when in the retracted state;

the body having a neck portion at its distal end, narrower than the main portion, that extends out of the bore in said retracted state; and the housing having a circumferential track, being defined between two housing elements, dimensioned to permit rotation in said retracted state and blocking the rotation in said extended state.

9. The closure system of claim 8, wherein the track has a width that is the same or wider than said neck portion but narrower than said main portion.

10. The closure system of claim 1, wherein a top end of the closure unit is releasably associated through an association arrangement to a frame header to thereby support the closure unit during said linear displacement, the association arrangement being configured to permit release of the closure unit therefrom when in the intermediate position.

11. The closure system of claim 10, wherein the association arrangement comprises one or more one or more first association members downwardly projecting from said frame header, each having a shaft and a head portion broader than the shaft; and corresponding one or more second association members formed at a top surface of the closure unit, each second association member defined an L-shaped slot with its upper part dimensioned to permit passages therethrough of the track while retaining the head portion within the slot, one leg of the L-shaped slot being open to permit disassociation or reassociation with the first association member when the closure unit is in said intermediate position.

12. The closure system of claim 11, wherein the opening of the L-shaped slot is below a plane defined by the other leg of the L-shaped slot.

13. A hinging device connectible to a frame element and to an edge of a closure unit and configured to permit (i) linear displacement of the closure unit between a closed position, in which said edge is distanced from said frame element, and an intermediate position, in which said edge and said frame element are proximal to one another, and (ii) pivotal movement about a pivot axis between said intermediate position and an open position, the hinging device comprising a housing attachable to another edge of the closure unit and the frame element and holding a rotatable element, rotatable between a first angular state and a second angular state; and a plunger having a proximal end coupled to the rotatable element and a distal end attachable to the other of the edge of the closure unit and the frame element, the plunger being reciprocable in a plunger axis between an extended state and a retracted state, defining a plunger stroke therebetween, the plunger stroke having a length that is the same as or larger than a span of said linear displacement;

wherein the plunger has a body with a main portion fitting into a bore defined in the rotatable element and fully received therein when in the retracted state;

the body having a neck portion, narrower than the main portion, at the end of the plunger that is away from the body, the neck extending out of the bore in the retracted state; and the housing having a circumferential track, being defined between two housing elements, dimensioned to permit rotation in the retracted state and blocking the rotation in the extended state.

14. The hinging device of claim 13, wherein in the first angular state said linear displacement is enabled and the rotatable element is blocked from rotation, the rotation towards the second angular state being enabled when the plunger is in the retracted state.

15. The hinging device of claim 14, wherein upon rotation into a state other than the first angular state, the displacement of the plunger into the extended state is blocked.

16. The hinging device of claim 13, wherein the plunger comprises an urging element, urging the plunger into the extended state.

17. The hinging device of claim 13, wherein the track has a width that is the same or wider than said neck portion but narrower than the main portion.

* * * * *